United States Patent [19]
Sakaki et al.

[11] Patent Number: 5,297,044
[45] Date of Patent: Mar. 22, 1994

[54] TORQUE AND ROTATING SPEED SENSOR

[75] Inventors: Minji Sakaki; Masaharu Sakoda, both of Hiroshima; Takeshi Inoue, Kanagawa; Yasuhumi Kawado, Yamaguchi, all of Japan

[73] Assignee: Mazda Motor Corporation, Hiroshima, Japan

[21] Appl. No.: 856,667

[22] Filed: Mar. 24, 1992

[30] Foreign Application Priority Data

Mar. 25, 1991 [JP] Japan .................. 3-059833

[51] Int. Cl.⁵ .................. G06F 15/50; G06G 7/70; G01L 3/02
[52] U.S. Cl. .................. 364/424.1; 324/209; 73/862.325; 73/862.326; 360/73.09; 74/866
[58] Field of Search .............. 364/424.1; 74/866, 867, 74/868, 732; 73/136, 862.34, 862.325; 360/10.1, 73.09, 137, 64, 27; 324/208

[56] References Cited

U.S. PATENT DOCUMENTS

| | | | |
|---|---|---|---|
| 3,640,156 | 2/1972 | Mori et al. | 74/866 |
| 3,693,183 | 9/1972 | Lemke | 346/74 MT |
| 3,839,729 | 10/1974 | Gross | 360/27 |
| 3,935,733 | 2/1976 | Schindler | 73/136 |
| 4,139,871 | 2/1979 | Yoshida et al. | 360/64 |
| 4,225,894 | 9/1980 | Fulukawa et al. | 360/137 |
| 4,604,656 | 8/1986 | Fujii | 360/10.1 |
| 4,787,255 | 11/1988 | Guay | 73/862.34 |
| 4,843,917 | 7/1989 | Van Selous et al. | 74/868 |
| 4,876,923 | 10/1989 | Crandall et al. | 74/732 |
| 4,916,560 | 4/1990 | Kawaguchi | 360/73.09 |
| 4,922,424 | 5/1990 | Hiramatsu | 364/424.1 |
| 5,103,694 | 4/1992 | Kobayashi et al. | 74/867 |

FOREIGN PATENT DOCUMENTS

| | | |
|---|---|---|
| 55-34369 | 9/1980 | Japan . |
| 1352275 | 5/1974 | United Kingdom . |

*Primary Examiner*—Thomas G. Black
*Assistant Examiner*—Jacques H. Louis-Jacques
*Attorney, Agent, or Firm*—Sixbey, Friedman, Leedom & Ferguson

[57] ABSTRACT

A pair of magnetic recording parts are axially spaced on a rotating shaft and a pair of magnetic heads for recording and reproducing a location signal are respectively opposed to the respective magnetic recording parts. Torque of the rotating shaft is calculated based on a quantity of a phase shift of the location signals reproduced by the respective magnetic heads and rotating speed of the rotating shaft is calculated based on a reproducing frequency of the location signal reproduced by one of the magnetic heads so that the magnetic recording parts and the magnetic heads serves as a sensor for detecting both torque and rotating speed. Thus, a number of parts of the sensor is lessened, being compacted with low cost.

13 Claims, 6 Drawing Sheets

Fig.4 recording frequency to magnetic recording part 2 recording frequency to magnetic recording part 3

Fig. 5 reproducing frequency from magnetic recording part 2 reproducing frequency from magnetic recording part 3 phase shifts

TORQUE AND ROTATING SPEED SENSOR

BACKGROUND OF THE INVENTION

This invention relates to a torque and rotating speed sensor for detecting both torque of a rotating shaft and rotating speed (rpm) of the rotating shaft.

In an automatic transmission in a car employing an torque converter, speed change, line pressure, and the like have been controlled according to an rpm (a number of rotation) of an engine or throttle valve opening. In addition, it is known that with the line pressure control according to the torque of a turbine shaft the automatic transmission effectively displays a feature.

Also a known technique is that a magnetic sensor is used for directly detecting the torque of a rotating shaft such as the turbine shaft. In the sensor, a pair of magnetic recording parts respectively to which a location signal in a circumferential direction of the rotating shaft is to be recorded are provided on the rotating shaft, being axially spaced, and a pair of magnetic heads for recording and reproducing the location signal are respectively opposed to the respective magnetic recording parts. A quantity of torsion of the rotating shaft is measured based on a phase shift of the location signals to be reproduced by each magnetic head so as to obtain the torque according to the torsion quantity (refer to Japanese Patent Publication Gazette No55-34369).

Accordingly, it may devised that the automatic transmission perfoms controls based on the torque of the turbine shaft detected by the magnetic sensor. While, in the automatic transmission control, in addition to the torque of the turbine shaft, rpm of an engine is required to separately detect for speed change control and torque-down control. The rpm of the engine can be obtained according to the detected rpm of the turbine shaft.

In such the case where torque and rotating speed are detected only from the single rotating shaft, however, each sensor for detecting each is required. Further, a space for arranging each signal detecting means for the sensors is required on the rotating shaft, which leads to an oversized, heavy, expensive automatic transmission. As to detection of the rpm, in a method of detecting the rpm from a frequency by writing an optical mark circumferentially on a surface of the rotating shaft and scanning the mark, a frequency for writing the optical mark cannot be made high, which means no improvement in detecting an accurate rpm.

An object of the present invention is to provide a torque and rotating speed sensor for simply, accurately detecting both torque and rpm without increases in size and weight and with low cost.

Another object of the present invention is to provide a torque and rotating speed sensor for simply, accurately detecting the rotating speed at any time of high and low rpm of the rotating shaft.

Another object of the present invention is to provide a torque and rotating speed sensor for accurately detecting torque and rpm of the turbine shaft in an automatic transmission.

Further object of the present invention is to realize an ideal line pressure control in the automatic transmission.

SUMMARY OF THE INVENTION

A torque and rotating speed sensor for detecting a torque of a rotating shaft and rotating speed thereof comprises:
 a pair of magnetic recording parts axially spaced each other on the rotating shaft and each to which a location signal in a circumferential direction of the rotating shaft is to be recorded;
 a pair of magnetic heads, respectively opposed to the respective magnetic recording parts, for recording and reproducing the location signal;
 torque calculating means for calculating the torque applied to the rotating shaft based on a quantity of a phase shift caused by a torsion of the rotating shaft between each location signal reproduced by a pair of the magnetic heads; and
 rpm (rotating speed) calculating means for calculating a rotating speed (rpm) of the rotating shaft based on a frequency of the location signal reproduced by one of a pair of the magnetic heads.

The rotating shaft causes a torsion when a torque is applied thereto during a rotation. This results in a phase shift between the location signals to be recorded and reproduced by each magnetic head to the axially spaced magnetic recording parts. The phase shift corresponds to a torsion of the rotating shaft, in consequence, the torque, which means that the torque calculating means can calculate the torque based on the phase shift.

On the other hand, a reproducing frequency of the location signal recorded on the magnetic recording part corresponds to the rpm of the rotating shaft. Thus, the rpm calculating means can calculate the rpm of the rotating shaft based on the reproducing frequency.

In this case, the rpm calculating means calculates the rpm N with a following equation.

$$N = N_0 f / f_0$$

Wherein $N_0$ is rpm of a rotating shaft when a location signal is recorded, $f_0$ is a recording frequency at the time, and $f$ is a reproducing frequency.

The torque calculating means calculates the torque T with a following equation.

$$T = \pi^2 G\, d^4 \Delta t N / 16 L$$

Wherein $\pi$ is the ratio of the circumference of a circle to its diameter, G is a modulus of rigidity, d is a diameter of a rotating shaft, $\Delta t$ is a quantity of a phase shift, N is rpm of the rotating shaft, and L is an interval between a pair of magnetic recording parts.

The magnetic head may be a magnetic head for both recording and reproducing, or head for recording only and head for reproducing only may be employed.

Accordingly, since the rpm is detected, using the magnetic signals, the detecing accuracy is enhanced. In other words, the magnetic signals makes it possible to raise the recording frequency and to detect the rpm at high frequency, thus enhancing the detecting accuracy.

As mentioned above, since the magnetic recording parts and magnetic heads serve to detect both torque and rpm of the rotating shaft, a number of parts required for detecting them can be lessened and the torque and rotating speed sensor can avoid being large, thus lowering the cost.

In calculation of the rotating speed, a number of signals per round of the rotating shaft which are reproduced by the magnetic head decreases as the rpm of the rotating shaft lowers, which means that the reproducing frequency lowers. Thus, errors for detecting the rpm are likely to be caused. Contrary, when the rpm of the rotating shaft increases, the reproducing frequency is made high, thus involving a sever burden in the rpm calculating means.

In order to solve the problem, it is preferable that each recording frequency of the magnetic heads for recording the location signal to a pair of the magnetic recording parts are made different and the rpm calculating means calculates the rpm of the rotating shaft at a low rotating region of the rotating shaft based on the reproducing frequency from one of the magnetic recording parts to which the signal is recorded with the higher recording frequency and calculates at a high rotating region of the rotating shaft based on the reproducing frequency from one of the magnetic recording parts to which the signal is recorded with the lower recording frequency.

In other words, since the reproduced signal from the magnetic recording part with the higher recording frequency of the location signal leads a high reproducing frequency in the low rotation region, the errors for detecting the rpm is reduced. On the other hand, with the reproduced signal from the magnetic recording part with the lower recording frequency of the location signal, an excessive rise of the reproducing frequency in the high rotation region of the rotating shaft is avoided, thus reducing the calculation burden in the rpm calculating means.

The magnetic recording part is preferable to be a tapeshaped magnetic film which makes one round on the rotating shaft by thermal-spraying a magnetic particle on a surface thereof. In this case, the magnetic particle may be, for example, iron oxide particle, chiefly composed of $Fe_3O_4$, or other magnetic metal such as cobalt. The magnetic recording parts may be formed by another method such as plating, coating.

The present invention can be applied to detect torque and rpm of a turbine shaft in an the automatic transmission of a car. In this case, a pair of the magnetic recording parts are provided on the turbine shaft, the torque calculating means calculates the torque T of the turbine shaft for controlling the automatic transmission, and the rpm calculating means calculates the rpm N of the turbine shaft for controlling the automatic transmission.

In detail, for controlling, for example, a line pressure PL supplied to hydraulic cylinders of a friction-connecting mechanism in the automatic transmission, the line pressure PL is determined with a following equation.

$$PL = K1 \cdot T + K2 \cdot N + K3$$

Wherein K1, K2 and K3 are constants respectively.

Accordingly, since respective exclusive sensors are not required for detecting each of the torque and the rpm of the turbine shaft of the automatic transmission, the automatic transmission is avoided to be oversized and heavy with a sufficient arranging space for the sensor, and modification of the layout for each element of the automatic transmission is less required. In addition, by detecting the torque and the rpm of the turbine shaft, the automatic transmission is improved in its control property.

The present invention is applicable not only to detect the torque and the rpm of the turbine shaft but also to detect the torque and rpm of a rotating shaft adopted to a machine tool or other mechanical equipment.

The foregoing and other objects of the present invention and novel features of the present invention will be more apparent from the following description made with reference to the accompanying drawings.

BRIEF DESCRIPTION OF THE DRAWINGS

The accompanying drawings show a preferred embodiment of the present invention, in which.

PREFERRED EMBODIMENT OF THE INVENTION

Figure 1:
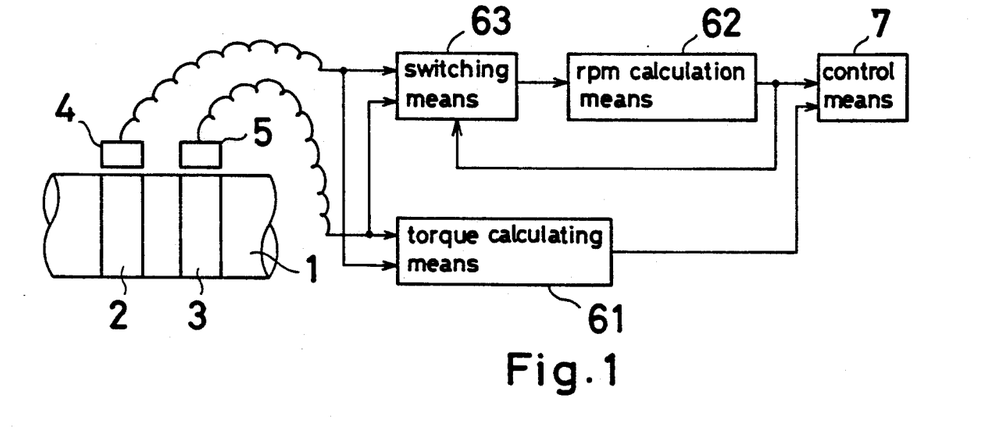
FIG. 1 is a schematic illustration showing a whole construction of the embodiment.
Figure 2:
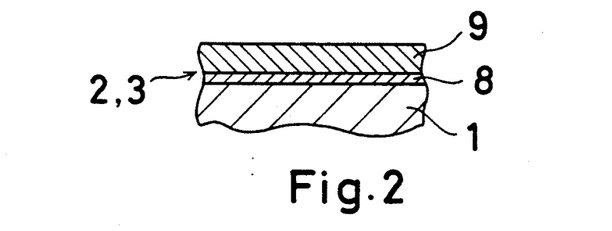
FIG. 2 is a sectional view showing a magnetic recording part.

FIG. 1 shows a construction of a torque and rotating speed sensor employed in an automatic transmission of a car. A turbine shaft 1 (rotating shaft) is made of iron-base material. Provided thereon are first and second magnetic recording parts 2, 3 which are axially spaced each other. First and second magnetic heads 4, 5 are respectively opposed to the respective magnetic recording parts 2, 3. The torque and rotating speed sensor includes torque calculating means 61, rpm (rotating speed) calculating means 62 and switching means 63 for introducing torque information and rpm information of the turbine shaft 1 to control means 7 of the automatic transmission, with signals obtained from the magnetic heads 4, 5 processing. Each magnetic recording parts 2, 3 is, as shown in FIG. 2, composed of a nonmagnetic film 8 and a magnetic film 9 thereon, being shaped in a tape which makes one round on the turbine shaft 1. The nonmagnetic film 8 serves to prevent leakage of magnetic flux to the turbine shaft 1 when the magnetic heads 4, 5 record respective signals to the magnetic film 9 and, in this embodiment, is formed by thermal-spraying an alminium-base metallic particle. To the magnetic films 9 respective signal, in detail, location signals in a circumferential direction of the turbine shaft 1 are recorded by the magnetic heads 4, 5. The magnetic film 9 is formed by thermal-spraying iron oxide particle chiefly containing $Fe_3O_4$.

The first and the second magnetic heads 4, 5 serve as a recording and reproducing head for both recoding the location signal in the circumferential direction of the turbine shaft 1 with a set frequency and reproducing the recorded location signal. The torque calculating means 61 calculates a torque applied to the turbine shaft 1 based on a reproducing frequency of the location signal obtained at the magnetic heads 4, 5. The rpm calculating means 62 calculates a number of rotation (rpm) of the turbine shaft 1 based on the recording frequency and the reproducing frequency of one of the magnetic heads 4, 5. The switching means 63 switches between the magnetic heads 4, 5 to introduce the signal to be used to the rpm calculating means 62. The control means 7 executes controls of speed change, line pressure, torque-down, and the like in the automatic transmission based on the torque and the rpm calculated by the respective calculating means 62, 63. Such means are described later.

Figure 3:
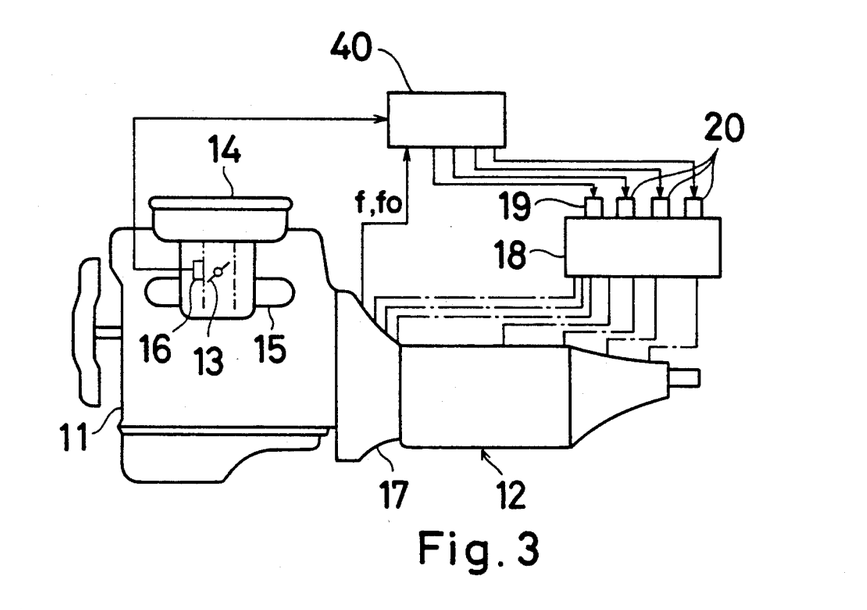
FIG. 3 is a schematic illustration showing a whole construction of an automatic transmission.

FIG. 3 shows an engine 11 and the automatic transmission 12. In the drawing, a reference numeral 13 designates a throttle valve interposed in a intake passage extending from an air cleaner 14 to an intake manifold 15. 16 is a throttle opening sensor for detecting opening of the throttle valve 13. 17 is a torque converter for transmitting the rotation of a crank shaft of the engine 11 to the turbine shaft 1 of the automatic transmission 12.

The automatic transmission 12 includes the torque converter 17, an auxiliary transmission of a planet gear type transmission mechanism having friction-connecting elements such as a multi-plate clutch and a band brake, a plurality of hydraulic cylinders for operating a lockup clutch of the torque converter 17 and the friction-connecting mechanism, and a control valve unit 18. The control valve unit 18 includes a line pressure control mechanism having a duty solenoid valve 19 for controlling a line pressure supplied to each hydraulic cylinder and a plurality of transmission solenoid valves 20 for controlling supply and discharge of the line pressure to each hydraulic cylinder. The control valve unit 18 are built inside the automatic transmission 12. A reference numeral 40 designates a control unit including the torque calculating means 61, the rpm calculating means 62, the switching means 63 and the control means 7.

Described below are calculation of the torque of the turbine shaft 1 by the torque calculating means 61 and calculation of the rpm of the turbine shaft 1 by the rpm calculating means 62.

The first and the second magnetic heads 4, 5 are different each other in their recorded frequencies of the location signal to the magnetic recording parts 2, 3 of the turbine shaft 1, namely, the first magnetic head 4 has the low recording frequency and the second magnetic head 5 has the high recording frequency. Under a condition of the turbine shaft 1 without load torque affected, both magnetic heads 4, 5 record the location signals so as to accord with each phase.

Figure 4:
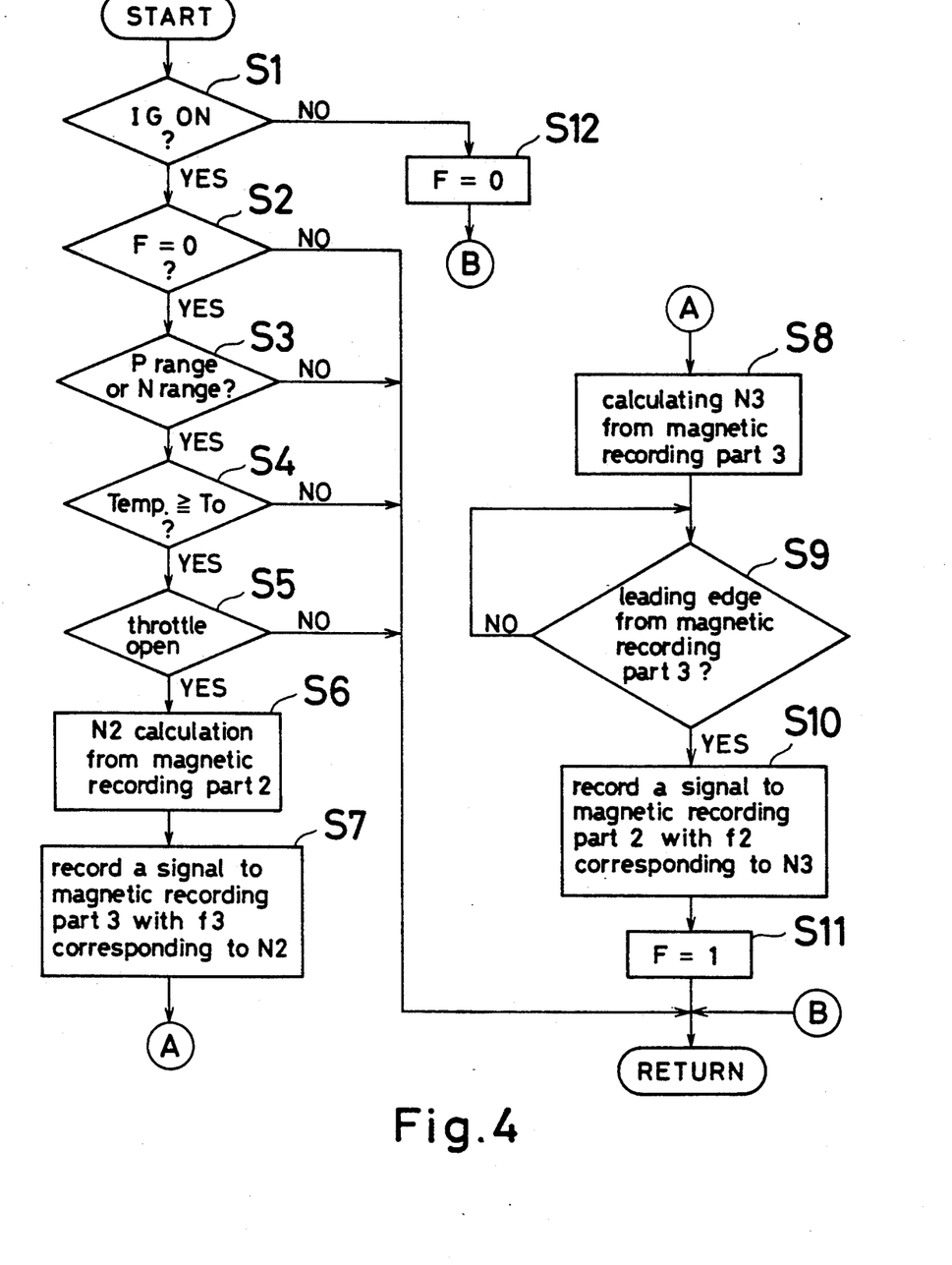
FIG. 4 is a flow chart indicating a process of recording a magnetic signal to the magnetic recording part.

In detail, as shown in FIG. 4, the rpm calculating means 62 calculates the rpm N2 of the turbine shaft 1, utilizing the location signal previously written on the magnetic recording part 2 only when the following conditions are all met (steps S1-S6): the ignition switch (IG) of the engine 11 is ON; F=0 (in other words, a location signal is not yet recorded to the magnetic recording parts 2, 3 after IG=ON.); a shift position of the automatic transmission 12 is in P range or N range; hydraulic temperature of the automatic transmission Temp. is a set temperature $T_o$ or higher (namely, stable condition of the engine operation); and the throttle valve of the engine 11 is closed (no load condition). With the frequency f3 corresponding to the obtained rpm N2, the location signal is recorded to the magnetic recording part 3 at a step S7. In this case, when a wave number of the signal to be recorded to the magnetic recording part 3 is k3, f3=k3×N2.

Then, at a step S8, with the location signal recorded to the magnetic recording part 3 the rpm calculating means 62 detects the rpm N3 of the turbine shaft 1. At steps S9 and S10, a leading edge of the signal from the magnetic recording part 3 is detected and the location signal synchronized with the location signal of the magnetic recording part 3 is recorded to the magnetic recording part 2 with the frequency f2 corresponding to the rpm N3 detected at the step S8 (when a wave number is k2, f2=k2×N3). After recording terminates, a flag F is made 1 at a step S11. When the ignition switch is OFF, the flag F is made 0 (F=0) (steps S1-S12).

In case of, for example, a 23 mm diameter of the turbine shaft 1, a magnetic signal is recorded to the magnetic recording part 2 so that the number of waves of the signal is 60 by one round, and is recorded to the magnetic recording part 3 so that the number of waves thereof is 120 by one round.

In this case, when the rpm of the turbine shaft 1 is 650 rpm, the recording frequency by the magnetic head 4 is 650 Hz (60×650÷60=650) and the recording frequency by the magnetic head 5 is 1300 Hz (120×650÷60=1300).

Figure 5:
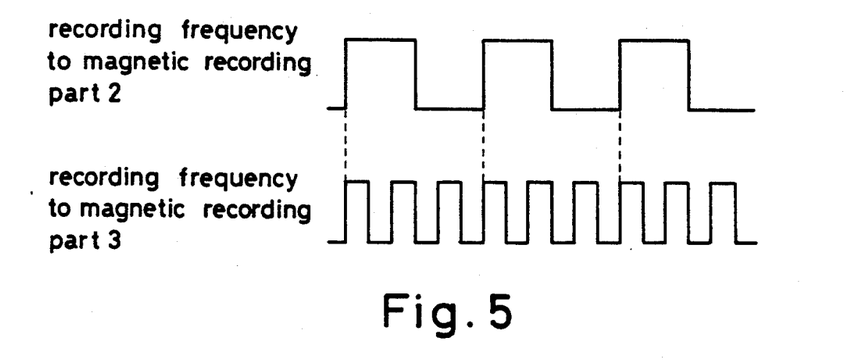
FIG. 5 is a diagram showing characteristics of recorded frequencies.

FIG. 5 shows a case where the wave number of the signal of the magnetic recording part 3 is made trebled to that of the magnetic recording part 2.

Figure 6:
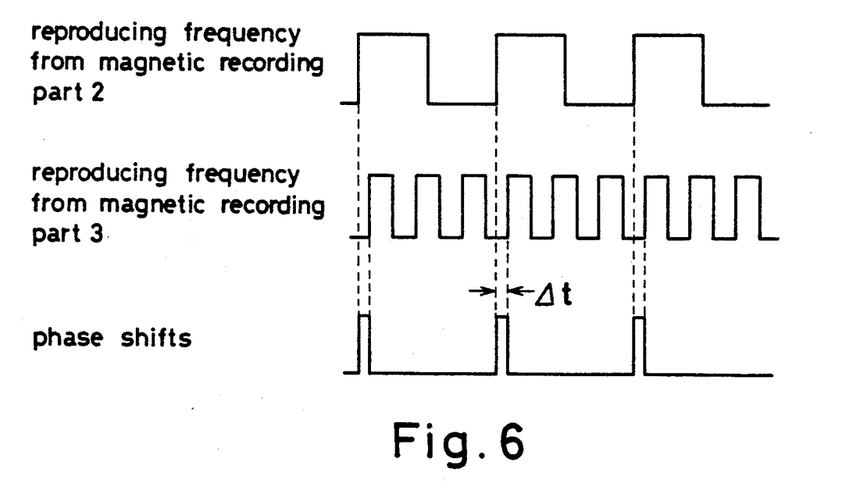
FIG. 6 is a diagram showing a relation between reproducing frequencies and phase shifts.

When the load torque affects to the turbine shaft 1, a certain torsion is caused thereon, which leads to a phase shift of the reproducing frequency between the magnetic heads 4, 5 (refer to FIG. 6). The quantity Δt of the phase shift corresponds to torsion angle of the turbine shaft 1, in consequence, corresponds to the load torque affected to the turbine shaft 1.

The torque calculating means 61 calculates the phase shift quantity Δt based on the reproducing frequency by the magnetic heads 4, 5 so as to obtain the torque T of the turbine shaft 1 with a following equation.

$$T = \pi^2 G d^4 \Delta t N / 16 L$$

Wherein $\pi$ is the ratio of the circumference of a circle to its diameter, G is a modulus of rigidity of the turbine shaft 1, d is a diameter of the turbine shaft 1, N is rpm of the turbine shaft 1 and L is an interval between the magnetic recording parts 2, 3.

The rpm calculating means 62 calculates the rpm N of the turbine shaft 1 with a following equation based on the recording frequency and reproducing frequency by one of the magnetic heads 4, 5 to which the switching means 63 switches.

$$N = N_o f / f_o$$

Wherein $N_o$ is the rpm of the turbine shaft 1 when the location signal is recorded, $f_o$ is the recording frequency at the time and f is the reproducing frequency.

Based on the rpm N previously calculated by the rpm calculating means 62, the switching means 63 switches to make the rpm calculating means 62 to calculate the rpm using the magnetic head 4 of the higher recording frequency when the turbine shaft 1 is in a low rotation region (low rotation mode) and to calculate the rpm using the magnetic head 5 of the lower recording frequency when the turbine shaft is in a high rotation region which exceeds a set rpm, 2000 rpm for example, (high rotation mode).

A description is made below about a line pressure mechanism of the automatic transmission 12 with reference to FIG. 7.

Figure 7:
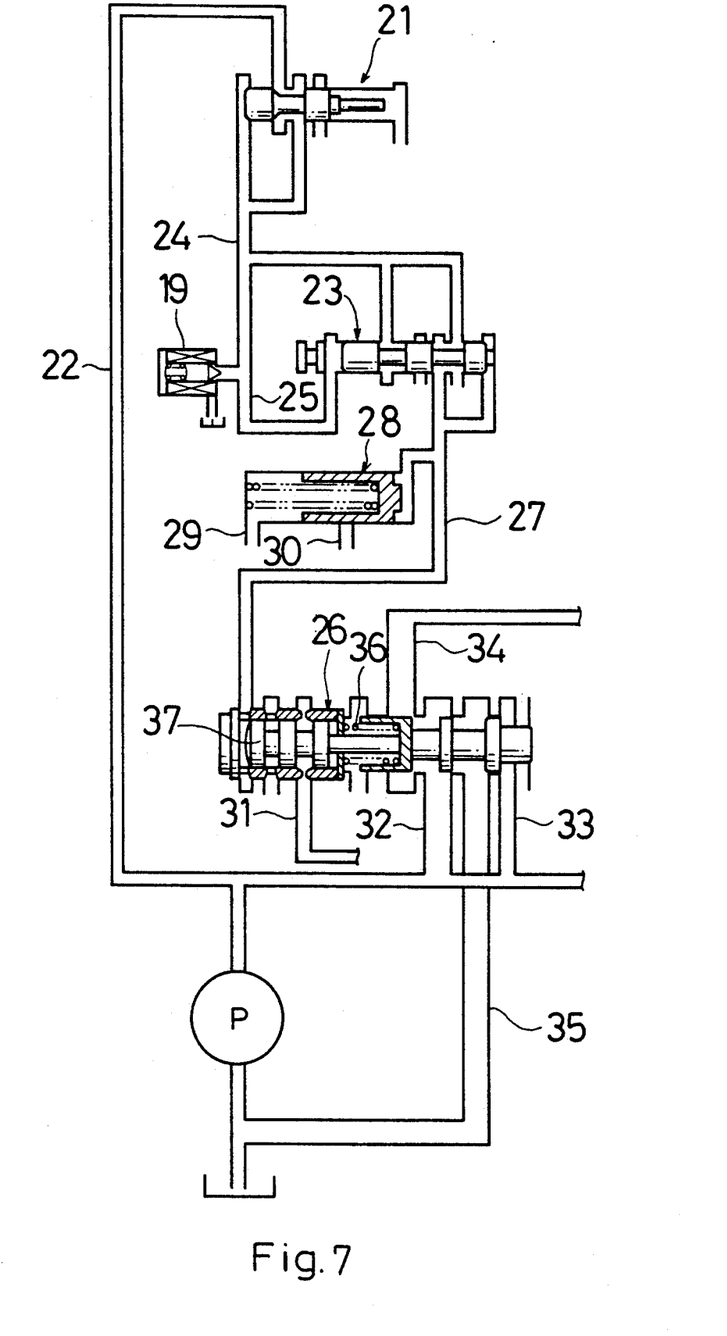
FIG. 7 is a schematic illustration showing a line pressure control mechanism.

In FIG. 7, a reference numeral 21 designates a pressure reducing valve, provided at an oil passage 22, for reducing an oil pressure generated at a pump P driven by the engine 11 to a set value. 23 is a throttle modulator valve which is receiving the oil pressure reduced by the oil pressure reducing valve 21 via an oil passage 24 and which is receiving the oil pressure as a pilot pressure via a duty pressure passage 25 provided with a duty solenoid valve 19. The throttle modulator valve 23 generates a throttle modulator pressure corresponding to a duty ratio of the duty solenoid valve 19. In this case, an operational oil pressure (duty pressure) within the duty pressure passage 25 is adjusted by controlling ON time ratio (duty ratio) per cycle of ON/OFF operation of the duty solenoid valve 19 (the duty pressure decreases as the duty ratio increases).

A line pressure control valve 26 receives the throttle modulator pressure via the pilot pressure passage 27 and adjusts the oil pressure generated at the pump P to appropriate pressure for operating the hydraulic cylinders of the friction-connecting mechanism at each speed shift stage. The pilot pressure passage 27 includes an accumulator 28 for stabilizing the pilot pressure to be supplied to the line pressure control valve 26 by absorbing hydraulic pulsating induced within the passage 27. The accumulator 28 has a drain port 29 and a discharge port 30 and serves as a relief valve also.

In the line pressure control valve 26, a reference numeral 31 designates a reverse oil passage communicating with a reverse port of an manual valve. 32 and 33 are respectively first and second line oil passages communicating with the hydraulic cylinders of the friction-connecting mechanism. 34 is a converter oil passage communicating with the torque converter 17. 35 is a drain oil passage.

Referring to an operation of the line pressure control valve 26 and the like, when the engine 11 stops (no line pressure), the converter oil passage 34 is closed by a spool 37 with a spring force of a spring 36. When the engine 11 is activated and the line pressure from the oil pump P affects thereto from the first line oil passage 32, the spool 37 moves leftward in the drawing against the spring force of the spring 36 and the pilot pressure, the converter oil passage 34 opens, so that the converter oil pressure affects to the torque convertor 17. When the rpm of the engine 11 increase accompanied by an increase of accelerator opening, increasing the line pressure, the spool 37 further moves leftward to drain via the first line oil passage 32 and the drain oil passage 35. Thus, the line pressure proportions to a combined force of the spring force of the spring 36 and the pilot pressure to be a stable, constant oil pressure.

Namely, the combined force against the spool 37 is controlled so that the line pressure proportioning to the combined force is controlled in such a manner that the control unit 40 controls the duty ratio of the duty solenoid valve 19 to adjust the duty pressure, in consequence, the pilot pressure.

The control unit 40 includes a microcomputer having CPU, ROM and RAM, an input/output interface, an analog-to-digital converter, a circuit for wave-shaping, a driving circuit for the transmission solenoid valve 20, a driving circuit for duty solenoid valve 19, and the like.

The ROM of the microcomputer stores beforehand respective programs for speed change control, line pressure control and torque-down control.

Figure 8:
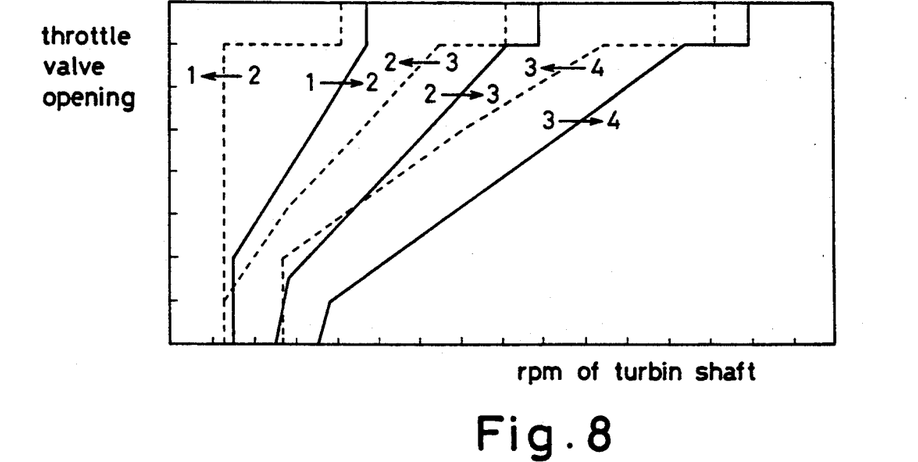
FIG. 8 is a graphical representation in speed change control.

Referring to the speed change control, a required speed shift stage is determined based on a speed change property (for example, as shown in FIG. 8) relating to the rpm signal from the rpm calculating means 62 and the throttle opening signal from the throttle opening sensor 16. The transmission solenoid valve 20 is controlled to be the speed change stage.

Figure 9:
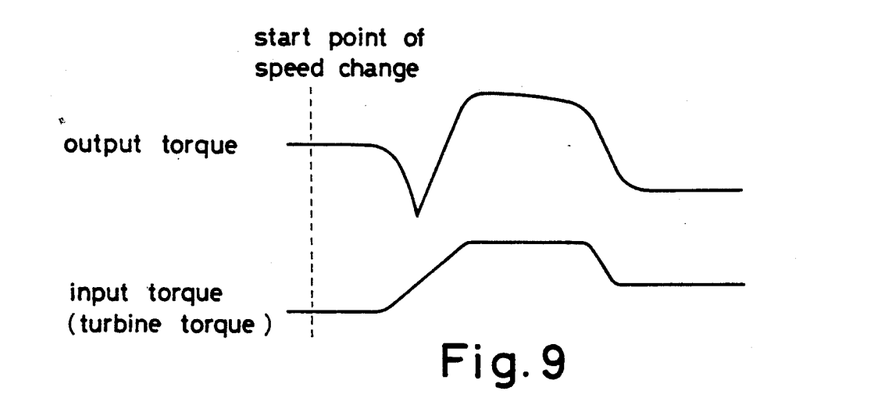
FIG. 9 is a graph illustrating time variations of input torque and output torque.

The torque signal from the torque calculating means 61 and the rpm signal from the rpm calculating means 62 are read and the line pressure PL supplied to a plurality of the hydraulic cylinders of the friction-connecting mechanism is determined with a following equation so that the line pressure is controlled via the duty solenoid valve 19. FIG. 9 shows variations of input torque (turbine shaft torque) and output torque as time at a speed change.

$$PL = K1 \cdot T + K2 \cdot N + K3$$

Wherein K1, K2 and K3 are constants respectively. T and N are the torque and the rpm of the turbine shaft 1 respectively.

Figure 10:
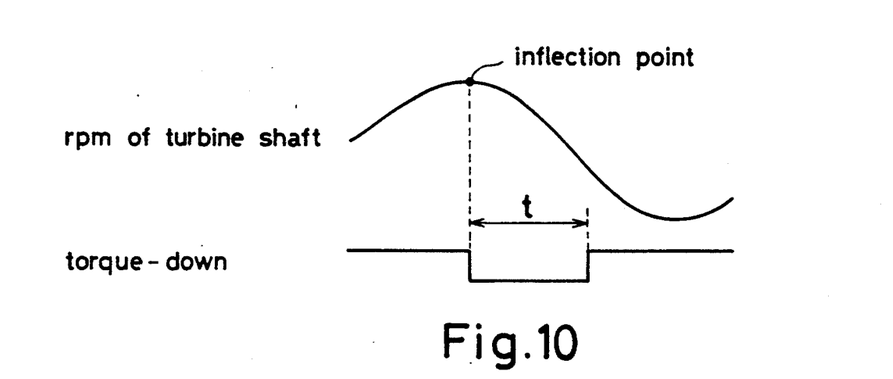
FIG. 10 is a graph illustrating a relation between rpm of a turbine shaft and a duration of a torque-down control.

In order to alleviate a speed change shock owing to an abrupt increase of the output torque accompanying with a switch-out of the speed shift stage, the torque-down control is performed by outputting a torque-down signal for temporally reducing the input torque from the engine 11 during a set period of time t from a inflection point of a rotating speed change (which corresponds to starting point of the speed change) based on the rpm signal from the rpm calculating means 62 (refer to FIG. 10).

Figure 11:
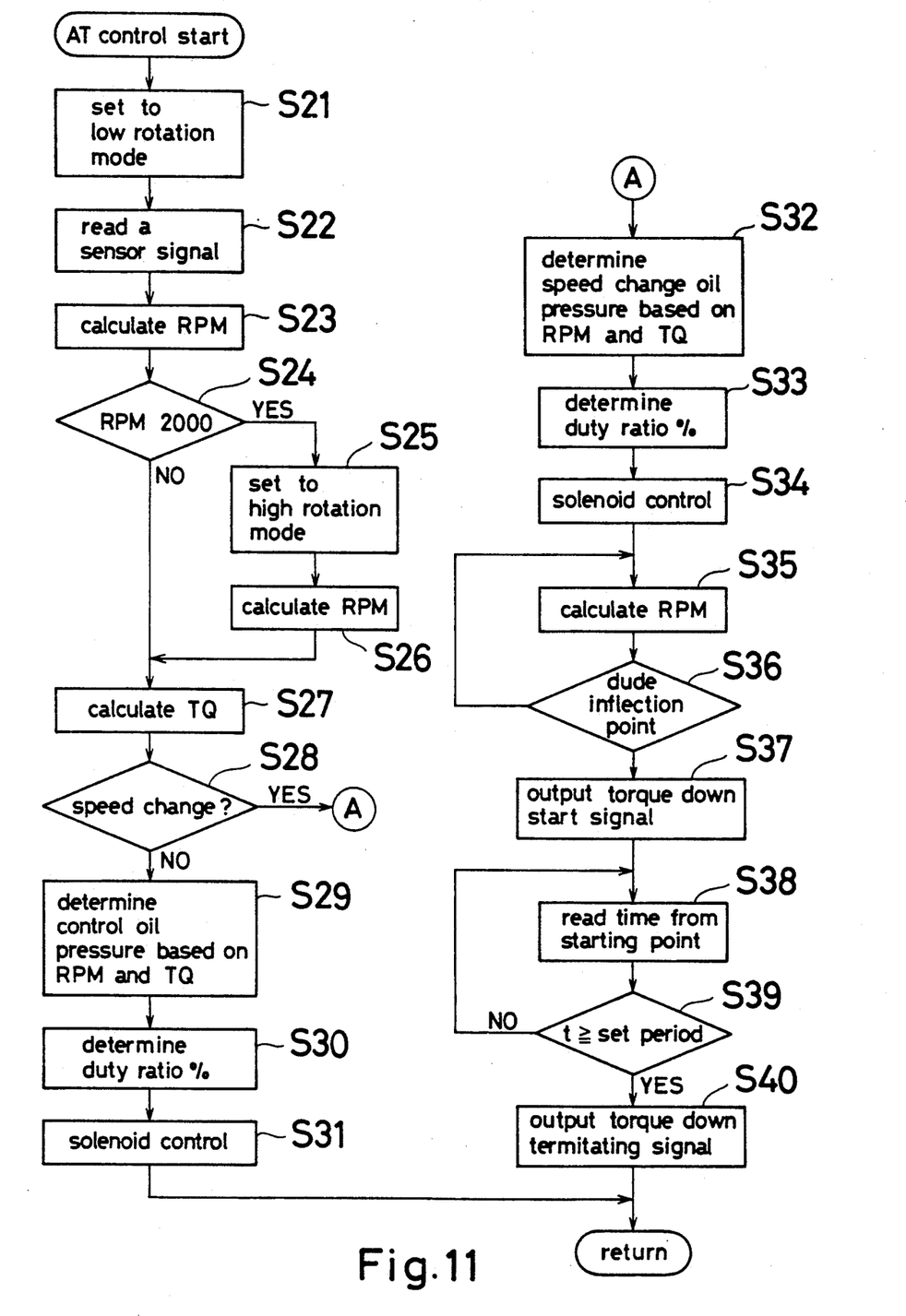
FIG. 11 is a flow chart showing a control in the automatic transmission.

Next, a flow for controlling the automatic transmission 12 is described with reference to FIG. 11.

The switching means 63 is set beforehand into the low rotation mode. The rpm calculating means 62 calculates the rpm RPM of the turbine shaft 1, reading a signal from the magnetic head 4 (steps S21–S23). If rpm RPM exceeds 2000, the switching means 63 is set into the high rotation mode, and the rpm RPM is recalculated based on a signal by the magnetic head 5. Then, the torque calculating means 61 calculates a torque TQ of the turbine shaft 1 (steps S24–S27). If the rpm RPM is equal to or below 2000, the torque TQ of the turbine shaft 1 is calculated, directly proceeding to a step S27.

In case of no speed change, the line pressure is determined based on the rpm RPM and the torque TQ, then the corresponding duty ratio is determined to control the duty solenoid valve 19 (steps S28–S31). In this case, at the step S29, the line pressure increases as the torque TQ increases and as the rpm RPM increases. Because an operation resistance of the friction-connecting mechanism increases as the torque TQ increases and as the rpm RPM increases, which requires a large line pressure.

In case of speed change, the line pressure is determined based on the rpm RPM and the torque TQ at the speed change, then the corresponding duty ratio is determined to control the duty solenoid valve 19. The inflection point to start the torque-down control is judged by calculating and reading the rpm RPM (steps S32–S36). At the step S32, the line pressure increases as the rpm RPM increases and as the torque TQ increases. Because the huge rpm RPM involves sever change of the turbine rotation at the speed change and an inertial force of the turbine affects, which requires a large line pressure. Also, with the large torque, it is necessary to increase connection force of the friction-connecting mechanism at the end of the speed change. At the step S36, a torque-down start signal is outputted when the inflection point is judged, then outputted is the torque-down terminate signal after the set period of time t (step S37–S40).

Accordingly, in the above embodiment, the magnetic recording parts 2, 3 are excellent in mechanical durability and thermal durability because of being respectively provided with the magnetic film 9 thermal-sprayed on the thermal-sprayed nonmagnetic film 8. Since the magnetic recording parts 2, 3 and magnetic heads 4, 5 serve as a torque and rotating speed sensor for detecting both rotating speed and torque, the sensor system is compacted to avoid an oversized heavy automatic transmission and layout modification for arranging the automatic transmission is lessened. In addition, since the rpm of the turbine shaft 1 is calculated using the magnetic head 4 of the higher recording frequency at the low rotation region and using the magnetic head 5 of the lower recording frequency at the high rotation region, the detecting accuracy is enhanced, the burden of the rpm calculating means is reduced, and a processablity of the control unit 40 increases. Further, as a result of using the torque of the turbine shaft 1 for the line pressure control, an ideal line pressure control can be performed to the necessary torque of the friction-connecting mechanism.

It is to be understood that the present invention is not limited to the above embodiment and many apparently widely different embodiments of the present invention may be made without departing from the spirit and scope thereof.

We claim:

1. A torque and rotating speed sensor for detecting a torque of a rotating shaft and a rotating speed of the rotating shaft, comprising:
    a pair of magnetic recording parts, axially spaced apart from one another on the rotating shaft, each to which a location signal in a circumferential direction of the rotating shaft is to be recorded;
    a pair of magnetic heads, respectively opposed to said respective magnetic recording parts, for recording and reproducing the location signal;
    torque calculating means for detecting the torque applied to the rotating shaft based on a quantity of a phase change caused by a torsion of the rotating shaft between each location signal reproduced by a pair of said magnetic head;
    rpm calculating means for calculating a number of rotations of the rotating shaft based on a frequency of the location signal to be reproduced by one of a pair of said magnetic heads; and
    signal recording means for recording the location signal to one of the magnetic recording parts by one of the magnetic heads with a frequency according to a frequency of the location signal reproduced from the other magnetic recording part by the other magnetic head, and for recording the location signal to the other magnetic recording part by the other magnetic head with a frequency according to a frequency of the location signal reproduced from the one of the magnetic recording parts.

2. A torque and rotating speed sensor according to claim 1, wherein said magnetic heads are different each other in a recording frequency of the location signal to each of said magnetic recording parts, said rpm calculating means calculates the rpm of the rotating shaft based on a reproducing frequency from one of said magnetic recording parts to which the location signal is recorded with the higher recording frequency at a low rotation region of the rotating shaft, and said rpm calculating means calculates the rpm of the rotating shaft based on a reproducing frequency from one of said magnetic recording parts to which the location signal is recorded with the lower recording frequency at a high rotation region of the rotating shaft.

3. A torque and rotating speed sensor according to claim 1, wherein each of said magnetic recording parts is magnetic film shaped in a tape which makes one round on the rotating shaft by thermal-spraying a magnetic particle on a surface of the rotating shaft.

4. A torque and rotating speed sensor according to claim 2, wherein said rotating shaft serves as a turbine shaft for an automatic transmission, said torque calculating means calculates a torque of said turbine shaft for controlling said automatic transmission, and said rpm calculating means calculates rpm of said turbine shaft for controlling said automatic transmission.

5. A torque and rotating speed sensor according to claim 4, wherein said rpm calculating means calculates the rpm N of the turbine shaft for controlling a line pressure PL supplied to hydraulic cylinders of a friction-connecting mechanism in said automatic transmission, said torque calculating means calculates torque T of the turbine shaft for controlling the line pressure PL of said automatic transmission, and the line pressure PL is determined with a following equation, $$PL = K1 \cdot T + K2 \cdot N + K3$$

wherein K1, K2 and K3 are constants respectively, T is a torque of the turbine shaft and N is an rpm of the turbine shaft.

6. A torque and rotating speed sensor according to claim 5, wherein said rpm calculating means calculates the rpm N with a following equation, $$N = N_o f / f_o$$

wherein $N_o$ is an rpm of the turbine shaft when the location signal is recorded, $f_o$ is a recording frequency at the time and f is a reproducing frequency.

7. A torque and rotating speed sensor according to claim 5, wherein said torque calculating means calculates the torque T with a following equation, $$T = \pi^2 G d^4 \Delta t N / 16 L$$

wherein $\pi$ is the ratio of the circumference of a circle to its diameter, G is a modulus of rigidity of the turbine shaft, d is a diameter of the turbine shaft, $\Delta t$ is a quantity of phase shift, N is an rpm of the turbine shaft and L is an interval between a pair of said magnetic recorded parts.

8. A torque and rotating speed sensor as claimed in claim 1, wherein said recording means records the location signal to the one of the magnetic recording parts with the frequency according to the number of the rotation which is calculated by the rpm calculating means on the basis of the frequency of the location signal reproduced from the other magnetic recording part.

9. A torque and rotating speed sensor as claimed in claim 1, wherein said signal recording means records the location signal to the other magnetic recording part with the frequency according to the number of the rotation which is calculated by the rpm calculating means on the basis of the frequency of the location signal reproduced from the one of the magnetic recording part.

10. A torque and rotating speed sensor as claimed in claim 8, wherein said signal recording means records the location signal to the other magnetic recording part with the frequency according to the number of the rotation calculated by the rpm calculating means on the basis of the frequency of the location signal reproduced from the one of the magnetic recording part.

11. A torque and rotating speed sensor as claimed in claim 1, wherein the signal recording means operates when the rotating shaft is under a specific rotating condition.

12. A torque and rotating speed sensor as claimed in claim 11, wherein said rotating shaft is a turbine shaft of a transmission of the vehicle, a detecting means for detecting a specific rotating condition of the turbine shaft according to an operating condition of the transmission is comprised, said signal recording means operates when the specific rotating condition is detected by the detecting means.

13. A torque and rotating speed sensor as claimed in claim 11, wherein a detecting means for detecting the rotating condition that the rotating shaft rotates without a load substantially, said signal recording means operates when the condition is detected by the detecting means.

* * * * *